United States Patent [19]

Bernard

[11] Patent Number: 5,394,185
[45] Date of Patent: Feb. 28, 1995

[54] IN-SERVICE CATV HUM MEASUREMENT TECHNIQUE

[75] Inventor: Kyle L. Bernard, Tigard, Oreg.

[73] Assignee: Tektronix, Inc., Wilsonville, Oreg.

[21] Appl. No.: 1,951

[22] Filed: Jan. 8, 1993

[51] Int. Cl.⁶ ............................................. H04N 17/00
[52] U.S. Cl. ................................. 348/192; 348/180
[58] Field of Search ............ 358/21 R, 21 V, 139, 358/86, 155, 10, 166, 167, 36, 37; H04N 17/02, 17/00, 17/04, 17/06; 364/484, 485

[56] References Cited

U.S. PATENT DOCUMENTS

| | | | |
|---|---|---|---|
| 4,686,457 | 8/1987 | Banno | 324/76.21 |
| 5,073,822 | 12/1991 | Gumm | 358/86 |
| 5,075,618 | 12/1991 | Katayama | 364/485 |
| 5,103,402 | 4/1992 | Morton | 364/485 |

OTHER PUBLICATIONS

No Loose Ends the Tektronix Proof-of-Performance Program for CATV by Clifford B. Schrock. Copyright 1973 Tektronix Inc.

*Primary Examiner*—Victor R. Kostak
*Assistant Examiner*—Nathan J. Flynn
*Attorney, Agent, or Firm*—Francis I. Gray

[57] ABSTRACT

An in-service hum and low frequency distortion measurement technique for in-service cable television channels having a video modulated carrier frequency obtains peak samples of the horizontal sync signal to effectively filter out the vertical interval frequency. The data record formed by the peak samples is filtered and input to a fast Fourier transform to obtain magnitude values for the fundamental and first harmonic frequency components corresponding to a powerline. From these magnitude values hum and low frequency distortion is computed as a percentage relative to the amplitude of the carrier frequency. The same procedure may be used with an input CW signal in an out-of-service measurement for hum only, the difference between the in-service and out-of-service measurements determining the low frequency distortion due to the video signal.

3 Claims, 1 Drawing Sheet

IN-SERVICE CATV HUM MEASUREMENT TECHNIQUE

BACKGROUND OF THE INVENTION

The present invention relates to the measurements of disturbances in a television signal, and more particularly to an in-service cable television (CATV) hum measurement technique for automatically determining hum related to powerline frequencies and low frequency disturbances related to the video signal.

Hum and low frequency disturbances (LFD) are undesired signal modulations related to powerline or video vertical sync frequencies. Variations in the visual carrier amplitude at the powerline frequency or its harmonics are known as "hum". It is difficult to determine video-related disturbances and hum when a video channel is in-service. Consequently a continuous wave (CW) signal is usually substituted for an in-service video signal carrier, but only hum alone is measured. This is an undesirable limitation since the channel is taken off the air to measure hum and it does not include LFD. The real problem in attempting to measure hum at 60 Hz and LFD on an in-service, active video channel is that the vertical sync pulses are present at 59.94 Hz. It is typically not possible to separate relatively weak powerline hum and LFD signals from the large vertical sync signal present only 0.06 Hz away.

A prior manual method for measuring hum and LFD is set out in the Application Note No. 26W-7043, published by Tektronix, Inc. of Wilsonville, Oreg., United States of America entitled "Cable TV Measurements Using the 2710 Spectrum Analyzer", at page 12. A spectrum analyzer, such as the 2710 Spectrum Analyzer manufactured by Tektronix, Inc., and a CW signal generator are used, with the CATV system under test receiving either the normal signal source for in-service hum and LFD measurements or a CW signal from the signal generator for measuring hum alone. With the center frequency set to the carrier or test signal frequency in zero span and LINE trigger modes, an operator observes on the analyzer screen the vertical intervals slipping slowly across the screen while line frequency disturbances remain stationary. Amplitude variations of the horizontal sync tips in response to video modulation indicate that the LFD is related to video rather than powerline. The variation of horizontal sync amplitude between vertical intervals in vertical divisions of the screen display may be converted into a percent disturbance. Alternatively with the analyzer in the PEAK acquisition mode the same measurement may be made. This measurement, due to the manual nature and relative expertise of the operator, is imprecise and only gives a single measurement of the hum and LFD.

What is desired is an automatic in-service cable television hum measurement cable technique that filters out the vertical sync energy and gives an accurate time domain sample of the hum and LFD signal present on an in-service, active video channel for precise determination of the percent of disturbance at both the powerline frequency and harmonics thereof.

SUMMARY OF THE INVENTION

Accordingly the present invention provides an in-service cable television (CATV) hum measurement technique that determines hum and low frequency disturbances (LFD) in the presence of vertical sync signals. The in-service channel is input to a spectrum analysis instrument with the carrier frequency centered on the display in zero span mode so that the information shown is the modulation present on the video carrier. The signal is sampled at a rate that guarantees that at least one sample of each horizontal sync peak is obtained, the horizontal sync pulses occurring at 15.748 kHz. This sampling scheme effectively filters out the vertical sync energy. After sampling, the signal is broken down into its component frequencies using a fast Fourier transform (FFT) from which the hum value is computed.

The objects, advantages and novel features of the present invention are apparent from the following detailed description when read in conjunction with the appended claims and attached drawing.

DESCRIPTION OF THE PREFERRED EMBODIMENT

Figure 1:
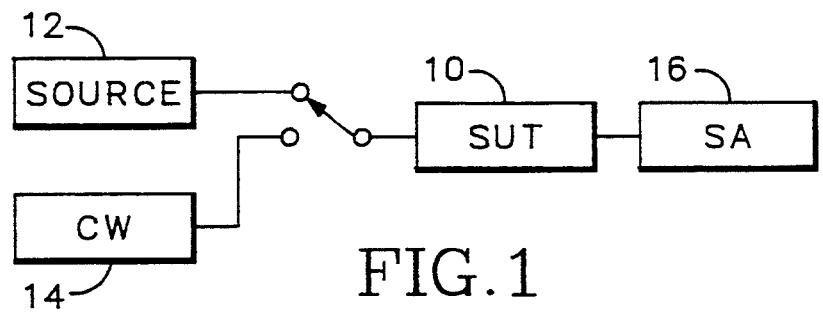
FIG. 1 is a block diagram view of a system for performing a hum and low frequency distortion measurement technique according to the present invention.

Referring now to FIG. 1 a system under test 10 has as an input a normal signal source 12 or a CW signal generator 14. The output of the system under test 10 is input to a spectrum analyzer 16 which acquires data from the system under test and performs a hum and low frequency distortion (LFD) analysis as described below. The spectrum analyzer may be a 2714 Spectrum Analyzer manufactured by Tektronix, Inc. An in-service measurement of hum and LFD is initiated by an operator at the spectrum analyzer 16 with the normal signal source 12 as the input to the system under test 10. An out-of-service measurement of hum alone is initiated by an operator at the spectrum analyzer 16 with the CW signal generator 14 as the input to the system under test 10. The measurement algorithm performed by the spectrum analyzer 16 on data acquired from the system under test 10 is identical for both in-service and out-of-service measurements.

Figure 2:
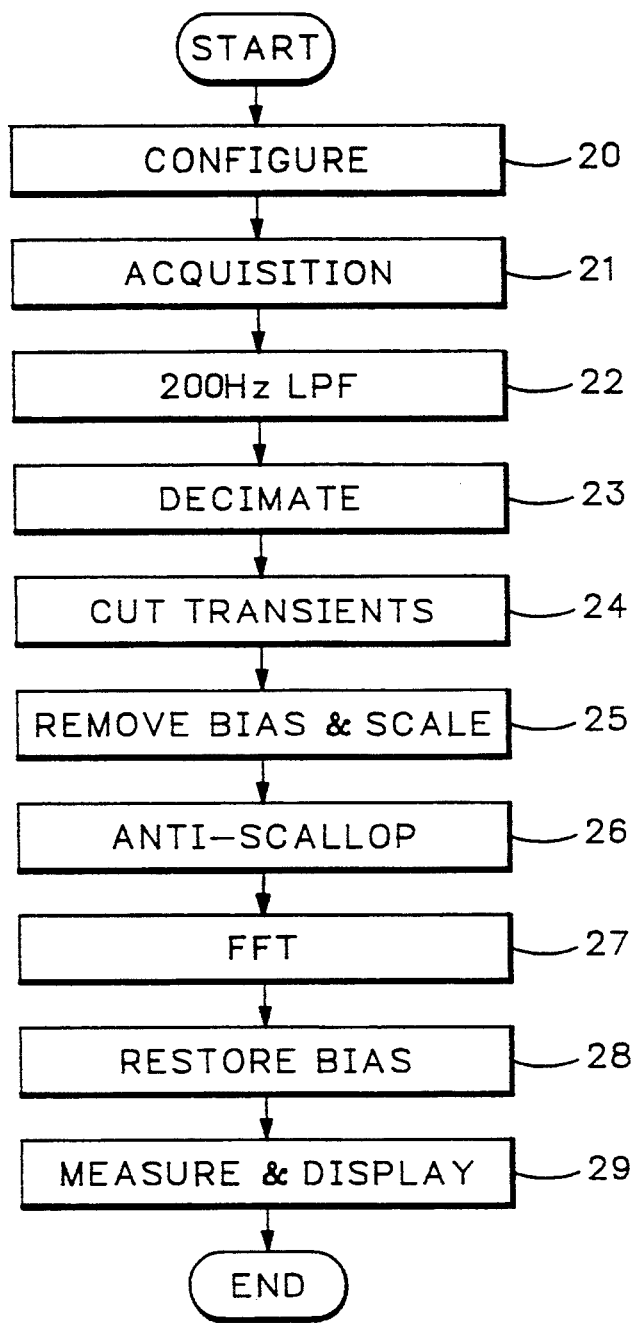
FIG. 2 is a flow chart diagram illustrating the hum and low frequency distortion measurement technique according to the present invention.

When the operator initiates a hum and LFD measurement sequence the algorithm shown in FIG. 2 is started. The first step is to configure (step 20) the spectrum analyzer 16 to acquire data from the system under test 10 at a designated in-service channel or frequency, such as the video carrier of a CATV video channel, with zero span so that the analyzer acts as a tunable down converter where the data obtained is the modulation present on the video carrier. A 300 Hz video filter could be used as an anti-aliasing filter, but only for the out-of-service measurement since otherwise it would remove the horizontal sync pulses which are required for the in-service measurement. Thus the video filter is left off. The acquisition mode is set for obtaining peak values and the sample rate is sufficiently high to allow at least one sample to be obtained from each horizontal sync peak, i.e., a digitizer is set to operate at 500 kHz (2 uS sampling interval). Since in a video signal the horizontal sync peak has the maximum amplitude, the result is that in peak mode the maximum, or peak, values represent the amplitudes of the horizontal sync pulses. With the sweep set at 20 mS/div with 50 digital points per division, there are 400 uS per digital point. At 2 uS sampling intervals this amounts to 200 samples per digital point. Thus each point that is output from the digitizer is the peak of the 200 samples of the input signal taken over the last 400 uS. Since for NTSC television signals the width of horizontal sync pulses is 4.7 uS, 2.3 uS for vertical equalization pulses, this guarantees at least one sample at the peak of each sync pulse. The horizontal sync pulses are repeated at 63.5 uS intervals so that over a 400 uS peak sampling interval there are at least six horizontal sync pulses per output point from the digitizer, i.e., the output of the digitizer and peak hold circuitry is the peak of the horizontal sync pulses. This effectively filters out the vertical sync energy and gives an accurate time domain sample of the hum/LFD signal present on the channel.

Once the spectrum analyzer 16 is configured, the signal from the system under test 10 is acquired and stored (step 21) in a digital memory within the spectrum analyzer. A single sweep acquires a data record of 5 12 output digital points from the digitizer and peak hold circuitry for the system under test 10 from which the hum/LFD measurements and calculations are made. The next step 22 is to perform a lowpass filter operation on the data record, with the cutoff frequency being set so that at least the primary and first harmonic of the powerline frequency is passed. For example a symmetric, 40-tap, lowpass FIR anti-aliasing filter with a cutoff frequency of approximately 200 Hz may be used. Depending on the length of the data record, and to reduce subsequent computation, the filter algorithm may be implemented using long integer arithmetic and scaling, and may be followed by a decimation step 23 to reduce FFT computation. The decimation is performed in conjunction with the filter computation.

Filter transients are cut out (step 24) from the data stream. Since filter transients are produced until the input data works its way through all the taps, there is invalid output data for the length of the filter, which when decimated involves the first several output digital points. The output from this step selects valid filter output digital points to send to the FFT calculation. Then to minimize leakage inaccuracies from the DC term and to avoid overflow errors in the FFT calculation, most of the DC bias in the filtered waveform is removed at this step 25. Since all inputs to the FFT are positive, the minimum value in the waveform is subtracted from all points and the resulting data is scaled up by three digital data bits to minimize calculation inaccuracies in the FFT calculation.

Each bin in an FFT output may be viewed as a lowpass FIR filter with a center frequency of $nf_s'/N$, where n is the bin number, $f_s'$ is the decimated sampling frequency and N is the length of the FFT. If the harmonic frequency being analyzed does not happen to fall in the center of an FFT bin, then a resulting loss in amplitude in that harmonic results if the bin response is not flat across its entire width. This inaccuracy is known as scalloping. Since it is not known precisely where the powerline harmonics may lie, it is important to minimize the scalloping error. A custom anti-scalloping window in this step 26 virtually eliminates scalloping. The maximum filter length is equal to the number of digital points input to the FFT. To avoid scalloping unity gain needs to be maintained throughout the bin. A Parks-McClellan algorithm is used iteratively to obtain the best passband and stopband characteristics using the number of taps, or input digital points. The filter tap values are used as the window coefficients.

The output from the anti-scalloping filter is input to the FFT (step 27) to produce a single sided magnitude spectra. The magnitude is calculated using an integer based estimation routine. The FFT calculates the DC term as an average of the input data that leads to %hum values relative to the average carrier level. Since hum is measured as peak-to-peak percentage of the peak carrier level, the DC contribution of the peak carrier level is added to the FFT result in a restore bias step 28 instead of just adding the amount removed in the remove bias step 25.

Finally small data windows around the powerline fundamental and first harmonic frequency bins in the FFT output data are searched (step 29) for the peak, which is taken as the %hum for the respective harmonics according to the formula below. The width of the data window is determined by the maximum tolerance in the sweep speed, which translates to sampling rate uncertainty. The hum values are calculated by:

$$\%hum = 400 * Lin\_ratio$$

where Lin_ratio is the ratio between the harmonic amplitude and the carrier DC amplitude in linear vertical mode. The factor of 4(4*100) comes from the two-sided nature of the FFT and the fact that peak-to-peak hum is desired and the FFT calculates peak hum.

$$\%total\_hum = SQRT((\%AM_{p10}/100)2 + (\%AM_{p11}/100)2)*100$$

where p10 is the power line fundamental frequency and p11 is the first harmonic. The hum data values are then shown as %total_hum, %hum$_{p10}$ and %hum$_{p11}$. The time domain data also is displayed.

Repeating the above algorithm for the out-of-service measurement produces hum only values, so that the difference between the in-service and out-of-service values defines the LFD alone.

Thus the present invention provides a method of determining hum and low frequency distortion in a channel of an in-service CATV system by obtaining peak samples representing the horizontal sync pulses and performing an FFT calculation to derive magnitude values at the fundamental and first harmonic powerline frequencies.

What is claimed is:

1. A method of measuring hum and low frequency distortion for an in-service channel of a cable television system having a carrier frequency modulated by a video signal comprising the steps of:
   acquiring a data record for the in-service channel representing peak values for horizontal sync pulses of the video signal; and
   performing a fast Fourier transform on the data record to obtain peak-to-peak percentage values of the hum and low frequency distortion relative to a magnitude of the carrier frequency at a fundamental and first harmonic frequency of a powerline providing power to the cable television system.

2. A method as recited in claim 1 wherein the acquiring step comprises the steps of:
   configuring a spectrum analysis instrument to center the carrier frequency in zero span mode;
   enabling a single sweep mode of the spectrum analysis instrument to acquire the data record; and
   low pass filtering the data record so that at least the fundamental and first harmonic frequencies are passed, including removing transient data points from the data record.

3. A method as recited in claim 1 wherein the performing step comprises the steps of:
removing d.c. bias from the data record;
applying a window function to the data record to eliminate scalloping effects on the data record;
performing the fast Fourier transform on the data record to obtain a magnitude spectra;
restoring d.c. bias to the magnitude spectra; and
searching for peak magnitudes at the powerline and harmonic frequencies from which the percentage values of the hum and low frequency distortion are calculated.

* * * * *